United States Patent [19]

Ying et al.

[11] Patent Number: 4,755,296
[45] Date of Patent: Jul. 5, 1988

[54] INTEGRATED BIOLOGICAL-ADSORPTION PROCESS FOR TREATING WASTE WATER

[75] Inventors: Wei-Chi Ying, Grand Island; Stanley A. Sojka, Buffalo; Vernon J. Lloyd, Lewiston, all of N.Y.

[73] Assignee: Occidental Chemical Corporation, Niagara Falls, N.Y.

[21] Appl. No.: 919,553

[22] Filed: Oct. 16, 1986

Related U.S. Application Data

[63] Continuation of Ser. No. 714,435, Mar. 21, 1985, abandoned.

[51] Int. Cl.$^4$ ................................................. C02F 3/02
[52] U.S. Cl. .................................... 210/631; 210/667; 210/694; 210/909; 210/901
[58] Field of Search ............... 210/631, 627, 616, 626, 210/617, 624, 620, 667, 694, 909, 901

[56] References Cited

U.S. PATENT DOCUMENTS

| | | | |
|---|---|---|---|
| 2,368,055 | 1/1965 | Walker | 210/631 |
| 3,846,293 | 11/1974 | Campbell | 210/631 |
| 4,073,722 | 2/1978 | Grutsch et al. | 210/631 |
| 4,382,865 | 5/1983 | Sweeney | 210/909 |
| 4,511,647 | 4/1985 | Colaruotolo et al. | 210/611 |

OTHER PUBLICATIONS

Irvine, R. L. et al.; "Enhanced Biological Treatment of Leachates from Industrial Landfills"; Hazardous Waste, vol. No. 1, pp. 123-135 (1984).

Irvine, R. L. et al.; "Treating Landfill Leachates by Pure Strain Inoculations of SBRs"; Paper Presented at Notre Dame Univ. Symposium; pp. 96-107 (May 24-26, 1982).

Argaman, Y. et al., "Evaluation of Chloroform Removal in Biological Treatment System to Meet BAT Limits"; Proc. of the 38th Ind. Waste Conf. Purdue Univ.; pp. 493-507 (1983).

Chemical Abstracts; vol. 101; 59561r; "Enhanced Biological Treatment of Leachates from Industrial Landfills"; (1984).

*Primary Examiner*—Benoit Castel
*Attorney, Agent, or Firm*—James F. Tao; William G. Gosz

[57] ABSTRACT

The invention relates to the treatment of chemical process wastewaters and chemical waste landfill leachates containing obnoxious and hazardous halogenated organic chemicals by the use of a combination of physical, chemical and biological processes to produce a liquid discharge acceptable to the environment in an efficient and economical manner.

5 Claims, No Drawings

INTEGRATED BIOLOGICAL-ADSORPTION PROCESS FOR TREATING WASTE WATER

This application is a continuation of application Ser. No. 714,435, filed Mar. 21, 1985, now abandoned.

BACKGROUND OF THE INVENTION

Since World War II the chemical industry has grown to the point where there are over 35 million metric tons of hazardous wastes being generated. Large quantities of these wastes contain synthetic halogenated materials such as found in dielectric fluids, flame retardants, refrigerants, heat transfer fluids, lubricants, protective coatings, pesticides, and herbicides. Furthermore, it is well known that both the petroleum industry and the coal industry contribute many more millions of metric tons of hazardous chemical wastes to be disposed of which contain obnoxious organic compounds. Many of these materials are non biodegradable or recalcitrant, i.e., difficult to biodegrade.

In many cases, these materials and the by-products or residues from their manufacture have been accumulated in landfills or discharged (treated or partially treated) into the conduits of municipal sewer systems. In the case of landfills and over the course of time, and by a process of liquifaction, the contents of the landfill ultimately produces a leachate which must be disposed of.

In the case of disposing of chemical wastewaters into the municipal systems, the chemical wastewaters are mixed and diluted into the municipal wastes, and they become contaminants which are difficult or impossible for the municipal wastewater treatment plants to handle in a way which meets the standards of disposal of such wastewaters and the sludges produced, set up by the Federal and State governments. In some cases the toxic chemicals pass through the municipal wastewater treatment system and show up "untreated" in the waste sludge and final effluents.

All kinds of methods and techniques have been proposed and used for disposing of and/or treating these chemical wastes and their by-products to make them compatible with the environment. In spite of all the effort and money being spent, no technology has evolved which is economically and technically satisfactory.

The present state-of-the-art for treating chemical process wastewaters and chemical landfill leachates involves employing a series of process steps which are difficult to manage and/or operate economically with results that meet the stringent effluent restrictions imposed by Federal and State laws.

BRIEF DESCRIPTION OF THE INVENTION

This invention relates to an integrated biological-adsorption process for treating wastewaters containing halogenated organic compounds to render them acceptable in the natural environment without adverse effects and in an efficient and economical manner. More particularly, this invention relates to the method for treating chemical process wastewaters and chemical waste landfill leachates containing obnoxious and hazardous halogenated organic compounds, by a process which comprises:

1. introducing the wastewater to be treated into an equalization zone to produce a substantially uniform liquid phase composition and to allow for sedimentation of undissolved solids;
2. transferring the equalized wastewater to a pretreatment zone, subjecting the said liquid to neutralization and oxidation to cause precipitation of metal hydroxides, which metals are present in the wastewater, such as iron, which adsorbs a portion of organic pollutants, and separating the precipitate so formed from the treated liquid;
3. transferring the pretreated wastewater, produced in Step 2, to a biological treatment zone to remove substantially all biodegradable organic constituents of the wastewater;
4. transferring the bio-treated wastewater to a carbon adsorption treatment zone to remove the balance of organic pollutants and to produce a discharge acceptable to the natural environment.

We have now found that the suspended solids produced in the physiochemical treatment step of our process removes a significant proportion of the nonbiodegradable halogenated organic compounds so that the biotreatment process may be economically employed in accordance with our invention to remove virtually all organic compounds remaining in the wastewater which are biodegradable, thereby allowing for the efficient and economical use of the carbon adsorption system for removing the balance of organic pollutants to produce a liquid discharge acceptable to the environment without adverse effects.

Still further, we have found that the carbon consumption rate for the adsorption system which is required for treating wastewaters containing high concentrations of organic pollutants is reduced by more than 90 percent after treatment of wastewater in sequencing batch bioreactors in accordance with our invention. Furthermore, our process is sufficiently flexible to accommodate changes in wastewater characteristics and operating variables as will be disclosed more fully herein after.

We have also found that the sequencing batch reactor biological treatment systems are particularly effective when combined and integrated into the overall wastewater treatment systems of our invention.

THE PRIOR ART

Processes for treating chemical wastewater and chemical landfill leachates are of course known and practiced in industry in order to comply with the municipal, state and federal laws governing the discharge of wastes. The 1972 Water Pollution Control Act (PL 92-500) which was amended in 1977 as the Clean Water Act (PL 95-217) required the U.S. Environmental Protection Agency (EPA) to set standards in 1984 on the control of effluents for conventional parameters such as chemical oxygen demand (COD), biochemical oxygen demand (BOD) as well as for a large number of toxic priority pollutants including many halogenated organic compounds. Accordingly, many new technologies have been proposed for complying with these new standards.

The present state-of-the-art for treating chemical landfill leachates is described in W. J. McDougall, R. A. Fusco, and R. P. O'Brien in "Containment and Treatment of the Love Canal Landfill Leachate" in Journal Water Pollution Control Federation, Vol. 52, pg. 2914–2924 (1980).

An overview and assessment of biological treatment systems relative to their overall applicability to industrial processing waste streams which discusses the various processes which may be considered including enzyme treatment, activated sludge, trickling filter, aerated lagoon, waste stabilization pond, anaerobic digestion and composting was given by Sandra L. Johnson in "Unit Operations for Treatment of Hazardous Wastes" (1978), pages 168 through 217 published by Noyes Data Corporation.

A review of physiochemical carbon adsorption process may be found in an article by Wei-chi Ying and Walter J. Weber, Jr. entitled "Bio-physiochemical Adsorption Systems Model", Journal Water Pollution Control Federation, Vol. 51, pg. 2661-2677 (1979).

More specifically, several recent patents have been issued which address specific problems to be solved in safely disposing of process wastewater.

A recent development in the biological treatment of wastewater designated as Sequencing Batch Reactors (SBR) is reported by Robert L. Irvine, and Arthur W. Bush in "Sequencing Batch Biological Reactors—An Overview" in Journal Water Pollution Control Federation, Vol. 51, No. 2, pg. 235-304 (1980).

The SBR process consists of five sequential biotreatment steps. The wastewater is fed, during FILL, to a tank, which contains acclimated activated sludge from the previous cycle. Aeration and mechanical mixing are provided while feeding and/or subsequently during REACT, to enhance the rate of aerobic biodegradation. After the mixed liquor is biologically stabilized as indicated by small oxygen utilization rate, air and mixing are stopped, and clarification takes place in the SETTLE step. During DRAW, the clear supernatant is withdrawn from the reactor for carbon adsorption treatment. The SBR cycle was either repeated immediately or the reactor was kept in IDLE until the FILL time in the next cycle.

Most recently, U.S. Pat. No. 4,477,570 issued Oct. 16, 1984, which is owned by the common assignee of this application, discloses the biodegradation of halogenated organic chemicals employing new found life forms.

Copending application, Ser. No. 381,866 filed May 24, 1982 now U.S. Pat. No. 4,511,657 issued Apr. 16, 1985, which is also owned by the common assignee of this application and in which one of the present applicants is a co-inventor discloses the use of the new life forms described in U.S. Pat. No. 4,477,570 as innoculants in biological wastewater treatment systems.

These and many other processes have been proposed for treating chemical wastewaters and/or chemical landfill leachates to make them compatible with the natural environment; however, they involve expensive and/or complicated techniques.

DESCRIPTION OF PREFERRED EMBODIMENT

In order that our invention may be more readily understood, we shall describe it with respect to the following specific embodiments and examples; however, it shall be understood that we do not intend to be limited thereby, except as defined in the appended claims.

EXAMPLE I

Several batches of aqueous leachate from a chemical landfill in Niagara Falls, N.Y., having a composition which includes organic compounds and halogenated organic compounds as exemplified in Table 1 were introduced into our equalization zone consisting of a 2000-L storage vessel. The combined leachate is maintained in a quiescent condition until a substantially uniform aqueous phase is formed. The supernatant was analyzed and found to have characteristics as shown in Table 2.

400 liters of said leachate were introduced into a pretreatment zone consisting of a 500-L plastic tank equipped with inlets for air, and sludge, and a mechanical mixer. Concentrated sodium hydroxide solution was added to this 400 liters of leachate while the mixer was operating and until the pH was equal to 7.5, causing precipitates to be formed. Air was introduced through the air inlet to this body of leachate over the course of about two hours, and this caused oxidation and more precipitates to be formed. After the immediate chemical oxygen demand was satisfied, air and mixing were stopped, and separation of precipitates by sedimentation was allowed. The composition of the pretreated leachate is also given in Table 2.

The sludge produced in the pretreatment zone was periodically removed and disposed of in a secure landfill. The pretreated leachate was then transferred to the biological treatment zone consisting of three parallel 500-L SCR tanks, each equipped with inlets for pretreated leachate feed, air, and nutrients, and a mechanical mixer.

The wastewater was fed, and solution of nutrients ($NH_4Cl$, $KH_2PO_4$) were added during FILL, to each tank, which contained acclimated activated sludge from the previous cycle which was obtained originally from a nearby publicly owned treatment works (Wheatfield, N.Y., 14304). Aeration and mechanical mixing were provided while feeding and/or subsequently during REACT to enhance the rate of aerobic biodegradation. After the mixed liquor was biologically stabilized as indicated by reduced rate of oxygen utilization, air and mixing were stopped, and clarification took place in the SETTLE step. During DRAW, the clear supernatant was withdrawn from the reactor for carbon adsorption treatment. The SBR cycle was either repeated immediately or the reactor was kept in IDLE until the FILL time in the next cycle. The SBR operating and cycle schedules are described in Table 3.

The bio-treated leachate, the composition of which is given in Table 4, was then transferred to the adsorption zone consisting of two carbon adsorbers in series. Each adsorber had a diameter of 8.0 cm and a depth of 120 cm packed with 3 Kg of Calgon Service carbon. After a residence time of 40 minutes in the adsorber effluent was discharged. The final effluent met the existing discharge limits as given in Table 5.

EXAMPLE II

In adsorption treatment of a chemical landfill leachate the capacity of activated carbon for each of the several major organic constituents are much lower than the capacity for the same compound in pure water because of competitive adsorptive of other adsorbable constituents, as shown in Table 6. The residual organic compounds, especially halogenated organics in the biotreated leachate, as produced in the process described of Example I, are well adsorbed on activated carbon. Table 7 shows that the carbon capacity for total organic carbon (TOC) in the bio-treated leachate was the same as in the untreated leachate; however, it shows that the carbon capacity for total organic halides (TOX) was improved very substantially.

Since the biotreatment in a SBR reduces the TOC of a leachate by more than 90 percent, it follows that the carbon consumption rate would be reduced by at least 90 percent if the biotreatment is placed before carbon adsorption in accordance with our invention. The expected cost savings over a ten year period in treating a chemical landfill leachate employing the process of this invention is given in Table 8.

The five SBR steps are often overlapped, and one or two steps may be omitted in a particular treatment cycle. The withdrawal of effluent may start as soon as a clear zone of supernatant is formed, and the wastewater feeding may being immediately after the completion of the DRAW step of the last SBR cycle. Many combinations of feeding, aeration, and mixing strategies are possible. The required nutrients are either supplemented to the feed or added directly to the bioreactor. The sludge wasting is accomplished by removing a portion of the settled sludge in the DRAW or IDLE step. The optimum SBR operating and cycle schedules must be experimentally established in accordance with the teachings given herein for a wastewater to achieve the specific treatment objectives. The hydraulic retention time (HRT) may be varied between 1 to 20 days, and the mixed liquor suspended solids (MLSS) may vary between 2000 and 15000 ppm. The SBR cycle time may also be varied from 8 hours to a few days. The excess biomass was also periodically removed and disposed of in a secure landfill.

The wastewaters which may be treated in accordance with our invention may vary widely in their composition and makeup. For example, the process of this invention allows for treating wastewaters from chemical landfills, such as the leachate specifically exemplified in the foregoing example. In addition, this invention allows for treatment of chemical wastewaters directly emanating from chemical manufacturing operations such as petroleum, food processing, and other industrial plants issuing waste pollutants.

The biological treatment techniques that may be employed in accordance with our invention, other than the SBR technique, include such variations as trickling filter, aeration pond, oxidation ditch, contact stabilization, rotating biological contactor, among others.

In the foregoing specific example of our invention which illustrates a preferred embodiment, we may employ several other adsorbents other than activated carbon, such as activated alumina, molecular sieves, etc. Furthermore, either virgin or regenerated adsorbents may be used to produce effluent within the discharge limits.

It should be understood that, although we have emphasized the treatment of wastewater containing significant quantity of halogenated organic compounds, our invention should not be construed as limited to these compounds because our integrated treatment process not only removes these recalcitrant and obnoxious compounds to acceptable limits, but also at the same time, eliminates less recalcitrant and undesirable compounds, such as oil, grease, fats, and hydrocarbons in general.

The foregoing detailed description has been given to enable an understanding of our invention; however, we do not intend to be limited to the exact details or the specific examples for many obvious modifications will occur to those skilled in art.

TABLE 1

Compilation of Organic Compounds Typically Found In Chemical Waste Landfills

| Empirical Formula | Compound Name |
|---|---|
| $C_7H_7Cl$ | Chloromethylbenzene (isomer) |
| $C_9H_{12}$ | C-3 Alkylbenzene |
| $C_6H_4Cl_2$ | Dichlorobenzene isomer |
| $C_8H_{11}$ | 2,4-Dimethyl-3-Hexanone |

TABLE 1-continued

Compilation of Organic Compounds Typically Found In Chemical Waste Landfills

| Empirical Formula | Compound Name |
|---|---|
| $C_{10}H_{14}$ | C-4 Alkylbenzene |
| $C_7H_6Cl_2$ | Dichlorotoluene isomer |
| $C_7H_{14}O$ | 2,2-Dimethyl-3-Propyloxirane |
| $C_4Cl_6$ | Hexachlorobutadiene |
| $C_6H_3Cl_3$ | Trichlorobenzene isomer |
| $C_{11}H_{24}$ or $C_{16}H_{34}$ | Saturated Hydrocarbon |
| $C_{12}H_{24}O_2$ | Undecanoic Acid Methylester |
| $C_7H_5Cl_3$ | Trichlorotoluene isomer |
| $C_8H_7O_2Cl$ | Methylester Chlorobenzoic Acid isomer |
| $C_6H_2Cl_4$ | Tetrachlorobenzene isomer |
| $C_{10}H_{23}ON$ | O—Decyl-Hydroxylamine |
| $C_7H_5Cl_2$ | Trichlorotoluene isomer |
| $C_{10}H_{21}Cl$ | 1-Chlorodecane |
| $C_6H_2Cl_4$ | Tetrachlorobenzene isomer |
| $C_{12}H_{10}$ | 1,1-Biphenyl |
| $C_{12}H_{10}O$ | 1,1-Oxybis-Benzene |
| $C_{11}H_{24}$ | Undecane |
| $C_7H_4Cl_4$ | Tetrachlorotoluene isomer |
| C-9 or C-12 | Branched Saturated Hydrocarbon |
| $C_{10}H_{10}O_3$ | Beta-Oxo-Benzenepropanoic Acid Methylester |
| $C_8H_{18}O_2$ | 1,3-Hexanediol-2-Ethyl |
| $C_8H_{18}O$ | 1-Propoxypentane |
| $C_9H_{18}$ | 3,4,5-Trimethyl-1-Hexene |
| $C_{14}H_{14}$ | 1,1-Ethylidenebis-Benzene |
| $C_{14}H_{14}$ | 1,1-Biphenyl-2-Ethyl |
| $C_{10}H_{21}Cl$ | 1-Chlorodecane |
| $C_{15}H_{32}$ | 2,5-Dimethyltridecane |
| $C_{16}H_{34}$ | Hexadecane |
| $C_{13}H_{16}O_2$ | Cyclohexylbenzoic Acid Ester |
| $C_{12}H_{14}O_4$ | Diethylester 1,2-Benzenedicarboxylic Acid |
| $C_5H_2Cl_6$ | Hexachlorocyclopentadiene |
| $C_{10}H_{11}OCl$ | 1-(4-Chlorophenyl)-1-Butanone |
| $C_{14}H_{29}Cl$ | 1-Chlorotetradecane |
| $C_7H_{14}O$—50 | 3-Methylcyclohexanol |
| $C_5H_{10}O_2$ | Tetrahydropyran-2-ol |
| $C_{14}H_{10}$ | Phenanthrene |
| $C_{10}H_{12}O_2S$ | 3-Phenylmethylthio Propanoic Acid |
| $C_{20}H_{10}O$ | 1-Ethenyloxy-Octadecane |
| $C_7H_2Cl_6$ | 1,2,3,4,7,7-Hexchloro Bicyclo-2,2,1-hepta-2,5-diene |
| $C_{14}H_{12}$ | 1,1-Ethenylidene bis benzene |
| $C_{18}H_{37}Cl$ | 1-Chlorooctadecane |
| $C_{16}H_{22}O_4$ | Butyl-2-Methylpropyl Ester 1,2-Benzenedicarboxylic Acid |
| $C_7H_8S$ | Benzene Methanethiol |
| $C_{14}H_{14}S$ | 1,1-Thiobis(methylene)bis-Benzene |
| $C_{14}H_{10}Cl_2$ | 1,2-Bis(p-Chlorophenyl)Ethylene |
| $C_{10}H_{22}O$ | 2,2-Dimethyl-1-Octanol |
| $C_6H_9OCl$ | 3-Chlorobenzene Ethanol |
| $C_{14}H_{22}O_3$ | 2,2,2-Triethoxyethyl-Benzene |
| $C_{24}H_{38}O_4$ | Diisooctylester-1,2-Benzenedicarboxylic Acid |

TABLE 2

Characteristics of Typical Raw and Pretreated Hyde Park Leachates

| Parameter[a] | Raw Leachate | Pretreated Leachate[b] |
|---|---|---|
| pH | 4.3 | 7.5 |
| Total organic carbon (TOC) | 3500 | 3200 |
| Chemical oxygen demand (COD) | 10040 | 9200 |
| Biological oxygen demand | 7500 | 7200 |
| Suspended solids (SS) | 900 | 80 |
| Volatile suspended solids | 300 | 40 |
| Total dissolved solids | 25700 | 22400 |
| Orthophosphate phosphorus | <1 | <1 |
| Acid-hydrolyzable phosphorus | 3 | 3 |
| Total phosphorus | 131 | 92 |
| Ammonia nitrogen | 150 | 130 |
| Total kjeldahl nitrogen | 180 | 160 |
| Nitrate nitrogen | 20 | 20 |

TABLE 2-continued

Characteristics of Typical Raw and Pretreated Hyde Park Leachates

| Parameter[a] | Raw Leachate | Pretreated Leachate[b] |
|---|---|---|
| Nitrite nitrogen | <5 | <5 |

[a]All values, except pH, are given in mg/L.
[b]Pretreatment consisted of neutralization with NaOH to a pH of 7.5, two hours of aeration, and two hours or longer of settling.

TABLE 3

Examples of SBR Operating and Cycle Schedules

| | Sequencing Batch Reactor | | |
|---|---|---|---|
| Operating Schedule | A | B | C |
| Wastewater feed | (pretreated leachate) | | |
| Sterilization of feed | (no) | | |
| Bacterial supplementation | (no) | | |
| SBR cycle time, hour | (24) | | |
| Working volume, liter | (300) | | |
| Feeding, % working volume | 20 | 20 | 50 |
| Hydraulic retention time, day | 5 | 5 | 2 |
| Mixed liquor suspended solids, mg/L | 5000 | 10000 | 10000 |
| Time per SBR cycle, hour | | | |
| FILL (air & mixing) | (6) | | |
| REACT (air & mixing) | (10) | | |
| SETTLE | (2) | | |
| DRAW | (5) | | |
| IDLE | (1) | | |

TABLE 4

Results of SBR Biological Treatment of Leachate[a]

| SBR sample | TOC | COD | TOX[b] | SS | HET acid | Phenol (mg/L) | Benzoic acid | o-CBA[c] | m-CBA | p-CBA |
|---|---|---|---|---|---|---|---|---|---|---|
| Feed | 2000 | 5300 | 325 | | 260 | 530 | 730 | 350 | 110 | 110 |
| A effluent | 140 | 510 | 110 | 114 | 170 | 6 | 6 | 12 | 25 | 3 |
| B effluent | 120 | 400 | 105 | 100 | 150 | 1 | 2 | 2 | 3 | 2 |
| C effluent | 536 | 1700 | 235 | 400 | 175 | 12 | 6 | 20 | 25 | 3 |

[a]Samples were taken at the end of the program.
[b]TOX = total organic halides
[c]CBA = chlorobenzoic acid.

TABLE 5

Discharge Limits of Final Effluent

| PARAMETERS | MAXIMUM CONCENTRATION[a] |
|---|---|
| pH | 5-10 |
| Phenol | 1 mg/L |
| TOC (excluding Methanol) or | 300 mg/L |
| TOC (total) | 1000 mg/L |
| Trichloroethylene | 10 μg/L |
| Tetrachloroethylene | 10 μg/L |
| Monochlorobenzene | 10 μg/L |
| Monochlorotolene | 10 μg/L |
| Benzene | 10 μg/L |
| Trichlorobenzenes | 10 μg/L |
| Tetrachlorobenzenes | 10 μg/L |
| Monochlorbenzotrifluoride (chloro-2,2,2-trichlorotoluene) | 10 μg/L |
| Hexachlorocyclobutandiene (C-46) | 10 μg/L |
| Hexachlorocylopentadiene (C-56) | 10 μg/L |
| Hexachlorocyclohexanes (C-66) | 10 μg/L |
| 2,4,5-Trichlorophenol | 10 μg/L |
| Endosulfan | 10 μg/L |
| Mirex | 1 μg/L |
| 2,3,7,8-Tetrachlorodibenzo-p-dioxin | Not Dectectable |

[a]Except for pH

TABLE 6

Adsorptive Capacities of Carbon for Major Leachate Constituents

| | Concentration (mg/L) | | | Adsorptive Capacity (mg adsorbed/g carbon) | | |
|---|---|---|---|---|---|---|
| Concentration Parameter | raw leachate | combined[a] waste feed | adsorber[b] effluent | carbon[c] loading | leachate[d] isotherm | pure[e] compound isotherm |
| pH | 5.3 | 5.5-6.4 | 5.5-6.4 | 5.5-6.4 | 4.9-5.5 | 5.0-6.0 |
| Phenol | 981 | 780 | ND$_{0.1}$[f] | 41.0 | 74.9 | 174 |
| Benzoic acid | 830 | 910 | 0.8 | 48.0 | 74.1 | 171 |
| o-chlorobenzoic acid | 562 | 372 | 7.4 | 19.6 | 22.9 | 109 |
| m-chlorobenzoic acid | 61 | 120 | ND$_{0.5}$ | 6.4 | 23.0 | 160 |
| p-chlorobenzoic acid | 40 | 80 | ND$_{0.1}$ | 4.2 | 15.7 | 171 |
| TOC | 3080 | 2618 | 318 | 137 | 143 | |
| TOX | 264 | 299 | 2.7 | 15.8 | 11.7 | |

[a]Average concentrations for the adsorber feed during an adsorption service cycle.
[b]Concentrations were measured at the end of an adsorption cycle.
[c]Total removal of the compound at the end of an adsorption cycle.
[d]Capacities were estimated at the feed concentration from the raw leachate isotherms.
[e]Capacities were estimated at the feed concentration from the pure compound isotherms.
[f]ND$_x$ = not detected at a detection limit of x mg/L.

TABLE 7

Adsorptive Capacities of Carbon for TOC and TOX in Raw and SBR-treated Leachate Samples[a]

| | Raw Leachate[b] | | SBR-treated Leachate[c] | |
|---|---|---|---|---|
| Activated Carbon Type | TOC | TOX | TOC | TOX |
| | (mg adsorbed/g carbon) | | | |
| Calgon F-300 | 133 | 11.7 | 152 | 127 |
| Calgon Service carbon | 97.9 | 8.8 | 113 | 75.9 |
| Carborundum 30 | 173 | 19.6 | 268 | 172 |
| ICI Hydrodarco 3000 | 103 | 11.5 | 87.8 | 83.8 |
| Laboratory reactivated | 148 | 18.3 | 115 | 91.6 |

TABLE 7-continued

Adsorptive Capacities of Carbon for TOC and TOX in Raw and SBR-treated Leachate Samples[a]

| Activated Carbon Type | Raw Leachate[b] | | SBR-treated Leachate[c] | |
|---|---|---|---|---|
| | TOC | TOX | TOC | TOX |
| | (mg adsorbed/g carbon) | | | |
| spent Calgon Service carbon | | | | |

[a]Adsorptive capacities were estimated from the Freundlich adsorption isotherms.
[b]Raw leachate: TOC = 3080 mg/L, TOX = 264 mg/L, pH = 5.3. The TOC capacities were estimated at TOC = 1500 mg/L, and the TOX capacities were estimated at TOX = 125 mg/L.
[c]SBR-treated leachate: TOC = 400 mg/L, TOX = 334 mg/L, pH = 6.8. (The raw leachate had a TOC of 8100 mg/L and a TOX of 780 mg/L). The TOC capacities were estimated at TOC = 300 mg/L, and the TOX capacities were estimated at TOX = 125 mg/L.

TABLE 8

Expected Saving in Treatment Cost with Integrated SBR-Adsorption Process

| Time Period (months) | Flow-rate ($m^3$/d) | TOC[a] Loading | Carbon[b] Usage (kg/d) | Carbon[c] Saving | Cost Saving[d] $/d | $1000/yr |
|---|---|---|---|---|---|---|
| 1 thru 6 | 95 | 142 | 991 | 892 | 1475 | 538 |
| 7 thru 12 | 295 | 215 | 1442 | 1298 | 2146 | 783 |
| 13 thru 18 | 250 | 202 | 1361 | 1225 | 2025 | 739 |
| 19 thru 24 | 144 | 170 | 1170 | 1053 | 1742 | 636 |
| 25 thru 30 | 144 | 170 | 1170 | 1053 | 1742 | 636 |
| 31 thru 36 | 144 | 170 | 1170 | 1053 | 1742 | 636 |
| 37 thru 120 | 144 | 170 | 1170 | 1053 | 1742 | 636 |
| 10-year Average Saving | | | | | $643,600/year | |

[a]The first 68 $m^3$/d at 1700 mg TOC/L; the next 45 $m^3$/d at 1000 mg TOC/L; the rest at 300 mg TOC/L.
[b]12 g/L for the first 68 $m^3$/d; 6.6 g/L for the next 45 $m^3$/d; 1.8 g/L for the rest.
[c]90% reduction in carbon exhaustion rate after biotreatment.
[d]$1.65/kg carbon. All costs are in 1984 U.S. dollars.

SBR Treatment System -
design TOC loading = 181 kg/d
average TOC loading = 173 kg/d

| | $/year |
|---|---|
| 1. Carbon saving | 643,600 |
| 2. Operating labor, misc. costs[a] | (0) |
| 3. Maintenance[a] | (50,000) |
| 4. Electrical power[b] | (18,000) |
| 5. Sludge disposal[c] | (21,300) |
| 6. Analytical[a] | (23,000) |
| 7. Nutrients and chemicals[d] | (4,600) |
| Net Saving | $526,700/year |

[a]Cost over the expanded adsorption operation required in the near future.
[b]$0.06/kWh.
[c]Total sludge production rate - 1.02 g/g TOC; dewatered sludge - 30% solid, disposal costs - $0.10/kg.
[d]Supplementing $NH_3$ and $H_3PO_4$ to a TOC/N—$NH_4$/P—$PO_4$ ratio of 150/10/2.

We claim:

1. The method for treating process wastewaters and chemical waste landfill leachates containing (1) non-biodegradable halogenated organic compounds; (2) inorganic metal contaminants including iron and its compounds and (3) biodegradable halogenated and non-halogenated organic compounds, to remove said (1), (2) and (3) from the wastewaters or leachates, to produce a liquid discharge capable of being assimilated in the natural environment without adverse effects, which comprises:
   1. introducing the wastewater containing the contaminants to be treated into an equalization zone to produce a substantially equalized wastewater and to allow for sedimentation and removal of undissolved solids;
   2. transferring the equalized wastewater containing said (1) non-biodegradable halogenated organic compounds; (2) inorganic metal contaminants and (3) biodegradable halogenated and non-halogenated organic compounds to a pre-treatment zone to produce a pretreated wastewater, subjecting the pretreated water to neutralization until a pH within the range of 6.5 to 8.5 is reached and to oxidation by aeration for a period of about 2 hours to produce a neutralized and oxidized liquid and to cause conversion of the metal contaminants to metal hydroxide contaminants and precipitation of said metal hydroxide contaminants which adsorb a significant proportion of the non-biodegradable halogenated organic compounds and separating the precipitates so formed containing the non-biodegradable halogenated compounds from the neutralized and oxidized liquid;
   3. transferring the neutralized and oxidized liquid, produced in Step 2, to a sequencing batch reactor biological treatment zone containing acclimated activated sludge to remove substantially all the biodegradable organic constituents in the liquid;
   4. transferring the bio-treated liquid to an adsorption treatment zone employing activated carbon in amounts which are less than about 10% of that required when not employing the above Step 3 thereby removing substantially all the organic contaminants not removed by the above Step 2, to produce a discharge acceptable to the natural environment.

2. The method of claim 1 wherein the neutralization and oxidation are conducted simultaneously.

3. The method of claim 1 wherein the adsorption treatment is carried out in a granular activated carbon adsorber.

4. The method of claim 3 wherein the granular activated carbon in the adsorption zone is virgin or regenerated activated carbon.

5. The method of claim 4 wherein exhausted granular activated carbon is replaced by virgin or regenerated activated carbon to allow for the uninterrupted production of a discharge acceptable to the natural environment.

* * * * *

UNITED STATES PATENT OFFICE
CERTIFICATE OF CORRECTION

PATENT NO. : 4,755,296
DATED : July 5, 1988
INVENTOR(S) : Wei-Chi Ying et al.

It is certified that error appears in the above-identified patent and that said Letters Patent are hereby corrected as shown below:

Column 4, line 19, change "SCR" to --- SBR ---.

Column 4, line 53, change "adsorptive" to --- adsorption ---.

Column 5, line 7, change "being" to --- begin ---.

Signed and Sealed this

Eighth Day of November, 1988

Attest:

DONALD J. QUIGG

Attesting Officer

Commissioner of Patents and Trademarks